United States Patent Office 3,793,408
Patented Feb. 19, 1974

3,793,408
METHOD FOR THE PURIFICATION OF BIS (2-ETHYL-HEXYL) PHOSPHORIC ACID
Wallace W. Schulz, Richland, Wash., assignor to the United States of America as represented by the United States Atomic Energy Commission
No Drawing. Filed Jan. 28, 1972, Ser. No. 221,795
Int. Cl. C07f 9/08
U.S. Cl. 260—990    7 Claims

ABSTRACT OF THE DISCLOSURE

Foreign products including the neutral organophosphorous compounds and the iron salts normally present in commercial bis(2-ethyl-hexyl)phosphoric acid (HDEHP), and the radiolytic degradation products of HDEHP on exposure HDEHP to beta and gamma irradiation are removed from HDEHP containing one or more of such products by contacting the said foreign product containing HDEHP with a macroreticular anion exchange resin in base form whereby the DEHP$^-$ ion of HDEHP exchanges with the anion of the resin and is thus adsorbed on the resin and the said foreign products are not adsorbed and will pass through a bed of particles of the resin. The adsorbed DEHP$^-$ ion is then eluted from the resin and acidified to form and recover the purified HDEHP.

CONTRACTUAL ORIGIN OF THE INVENTION

The invention described herein was made in the course of, or under, a contract with the United States Atomic Energy Commission.

BACKGROUND OF THE INVENTION

The invention relates to a method of removing from bis(2-ethyl-hexyl)phosphoric acid (HDEHP) the neutral organophosphorous compounds and iron salts normally present in commercial HDEHP, and especially the invention relates to the removal of the radiolytic degradation products produced when the HDEHP is exposed to radiation fields such as those attained when the HDEHP is used as an extractant for recovery or removal of actinides and radioactive fission products from radioactive waste and feed solutions. The invention includes the recovery of the purified HDEHP.

Numerous liquid-liquid solvent extraction processes which use bis(2-ethyl-hexyl)phosphoric acid (HDEHP) as the extractant have been developed at Oak Ridge, Tennessee and at Hanford, Washington for recovery or removal of actinides and various radioactive fission products from radioactive waste and feed solutions. Currently, for example, HDEHP diluted with tributyl phosphate (TBP) and NPH (a mixture of alkanes) is used in one of the Hanford plants to remove radioactive strontium and rare earths from tri-n-butyl phosphate extraction wastes. Gradual but continuous radiolytic degradation of the HDEHP extractant occurs in these processes.

The most significant and serious manifestation of radiolytic degradation of the Hanford plant solvent is a gradual decrease in strontium extraction capacity. The decrease in strontium extraction capacity is considerably more than can be accounted for by the small decreases in HDEHP concentration. Radiation apparently promotes polymerization of the HDEHP molecules to entities which extract strontium less efficiently than do the dimeric HDEHP species in unirradiated extractants. Aqueous washes remove fission product impurities from used plant solvent but do not restore strontium extraction capacity.

To maintain strontium extraction capacity, current practice is to butt periodically the plant solvent inventory with virgin HDEHP and TBP. This practice is only a stop-gap measure, however, since ever increasing HDEHP and TBP concentrations are necessary to maintain adequate strontium extraction. Eventually, as the result of the high HDEHP and TBP concentrations, the physical properties of the solvent inventory will fall outside an acceptable range. Disposal of a valuable solvent inventory will then be necessary if some method is not available for regenerating or reclaiming it.

An ion exchange process for fractionation of degraded HDEHP-TBP-hydrocarbon diluent solvents to recover valuable undamaged extractant components has now been devised by applicant. This process can also be used to purify commercially available, unirradiated HDEHP from neutral impurities.

SUMMARY OF THE INVENTION

In accordance with the invention foreign products including the neutral organo-phosphorous compounds and the iron salts normally present in commercial HDEHP, and the radiolytic degradation products of HDEHP formed on exposure of HDEHP to beta and gamma irradiation are removed from HDEHP containing one or more of such products by contacting the said foreign product containing HDEHP with a macroreticular anion exchange resin in basic form whereby the DEHP$^-$ ion of HDEHP exchanges with the anion of the resin and is thus adsorbed on the resin and the said foreign products are not adsorbed and will pass through a bed of particles of the resin. The adsorbed DEHP$^-$ ion is then eluted from the resin and acidified to form and recover the purified HDEHP.

The elution of the DEHP$^-$ ion and the formation and recovery of the HDEHP can be accomplished in various ways. One highly satisfactory way is to elute the DEHP$^-$ adsorbed anion with dilute (viz. 0.5 M) aqueous or alcoholic isopropanol KOH solutions. In this process the OH$^-$ of the solution is exchanged for the DEHP$^-$ on the resin and the resin is converted to hydroxide form. However, other alcohol-alkaline hydroxide or carbonate solutions may be used. Also, HNO$_3$ or HCl solutions may be used to elute the DEHP$^-$ and thus to regenerate HDEHP directly.

Generally the HDEHP is regenerated from the dilute alcoholic and aqueous KOH eluant solutions. Acidification of the aqueous KOH solution, as for example, to 1 M HNO$_3$, regenerates HDEHP which is immiscible with the aqueous phase. Recovery of the HDEHP from alcoholic KOH solution is readily accomplished by diluting it, for example, tenfold with water and then further acidifying to, for example 1 M HNO$_3$. Dilution with large amounts of water is done to partition the HDEHP from isopropanol.

The HDEHP is preferably passed through a bed of macroreticular resin as an organic solvent solution in an inert organic solvent such as diluted in tributyl phosphate (TBP) and normal alkanes such as a mixture of C$_{10}$–C$_{14}$ normal paraffins. HDEHP and other acidic components load onto the resin while neutral TBP, NPH, isopropanol and metallic components do not load and so are collected in the effluent solution. For the ion exchange purification of unirradiated, commercially-available HDEHP, feed for the loading (adsorption) step is conveniently prepared by diluting the HDEHP with isopropanol.

Following the loading step the wash solutions are preferably passed through the resin bed to ensure removal of nonadsorbed materials and to prepare the bed for the elution step. Great flexibility is possible in the choice, amounts, and sequence of the various wash solutions. For instance, when the HDEHP is loaded from plant solvent, NPH washes are preferred for removal of nonadsorbed TBP. Similarly, when the HDEHP is loaded from an isopropanol-HDEHP solution, isopropanol washes serve to wash neutral impurities from the bed. Ethylene glycol washes also appear to be of value for partial removal of any coadsorbed mono-2-ethylhexyl phosphoric acid ($H_2MEHP$). Finally, water washes may be used, if desirable, to remove NPH, isopropanol, ethylene glycol, etc., just prior to the elution step.

Both weak base and strong base macroreticular anion exchange resins satisfactorily adsorb $DEHP^-$ from solutions of HDEHP by exchange of the anion of the resins with the $DEHP^-$ ion of the HDEHP. This adsorption may also be referred to as adsorption of the HDEHP. Experiments show, however, that the affinity of the weak base macroreticular resins is greater than that of the strong base macroreticular resins. The experiments also demonstrated that the kinetics of ion exchange adsorption of HDEHP ($DEHP^-$) are favored by slow flow rates, small resin particle size and by operation at above 25° C., such as 50° C.

Suitable strong base macroreticular anion exchange resins are styrene-divinyl benzene copolymers having quaternary ammonium functional groups. Resins of this type are sold by Rohm & Haas Company under the trademarks Amberlyst A-26 and Amberlyst A-29. These may be prepared by the methods described in British Pats. 932,125 and 932,126, for example, Example VI of both patents, and in J. Amer. Chem. Soc., 84, p. 305. The preferred weak base macroreticular anion exchange resins are styrene-divinyl benzene copolymers having amino functional groups. A resin of this type is sold by Rohm & Haas Company under the trademark Amberlyst A-21. These may be prepared by the method described in British Pats. 932,125 and 932,126, for example, Example X of both patents.

A generic description of the preferred cross-linked macroreticulated ion exchange resins used in this invention is given in claim 3 of British Pat. 932,125 as supported by the disclosure in British Pat. 932,125. As set forth in this claim and the disclosure in the patent, the resin is a polymerized mass composed of a cross-linked copolymer of (1) polyunsaturated monomer containing a plurality of $CH_2=C<$ groups in nonconjugated relationship and (2) monoethylenically unsaturated monomer, wherein said polymerized mass is constituted by an aggregation of micro beads which is resistant to physical stress, the aggregation of micro beads being visible in an electron photomicrograph and defining a retention of microscopic channels extending through the mass, said mass having ion exchange groups thereon. The strong base anion exchange resin of this invention is a quaternary anion exchange resin made by using trialkylamine as the aminating agent. Both weak base (amino groups and not quaternary groups) and strong base type and methods of making them are disclosed in British Pats. 932,125 and 932,126. British Pats. 932,125 and 932,126 are hereby incorporated in this application by reference.

The particle size of the resins is not critical, suitably being from −8 mesh to +100 mesh (U.S. Standard Screen), 14 mesh to 50 mesh being generally used.

The HDEHP is preferably used dissolved in an organic solvent which dissolves the HDEHP without reacting therewith, such as ethyl alcohol, isopropanol, ethylene glycol, hydrocarbons of all types, such as benzol, hexane and kerosene. A suitable solvent is NPH or tributyl phosphate diluted with NPH. NPH is a mixture of $C_{10}-C_{14}$ normal paraffins, the relative proportion of the various hydrocarbons not being critical for this invention.

DETAILED DESCRIPTION OF THE INVENTION

The applicability and utility of the ion exchange process of this invention for (a) the removal of radiolytic degradation products from HDEHP exposed to intense radiation fields of beta and gamma rays, and for the regeneration and reuse of the purified HDEHP, and (b) purifying commercially available HDEHP are illustrated in the following examples:

Example 1.—Treatment of used Hanford B-Plant solvent

The resin bed consisted of 90 ml. (dry volume) of Rohm & Haas Amberlyst A-21 weak base macroreticular resin (14 to 45 mesh) in the hydroxide form. Three column volumes of actual Hanford B-Plant solvent (0.32 M HDEHP −0.41 M TBP-NPH) were passed downflow through the bed at 25° C. at about 1 ml./min. (Prior to use the B-Plant solvent was washed with equal volumes of 6 M $HNO_3$ and water to convert any NaDEHP to HDEHP.) The loaded bed was washed (2 ml./min. at 25° C.) successively with 3 column volumes of NPH and 2 column volumes of water to remove nonadsorbed TBP, HDEHP, and at least some of the NPH. Two column volumes of 0.5 M KOH in isopropanol were passed (1 ml./min. at 25° C.) to elute the HDEHP. The eluant solution was diluted tenfold with water and acidified to regenerate and recover the HDEHP. The final product was a 1.9 M HDEHP-NPH solution containing 2.6 vol. percent isopropanol and about 2 vol. percent water but no TBP.

An extractant of the composition 0.3 M HDEHP−0.2 M TBP-NPH was prepared from the final product solution by addition of TBP and NPH. This extractant was contacted with an equal volume of synthetic B-Plant extraction column feed solution (containing $^{85}Sr$); the strontium distribution ratio ($E_a^o$ was 8.14. For the same extraction conditions, the Sr $E_a^o$ was 9.0 for a 0.3 M HDEHP−0.2 M TBP-NPH extractant prepared from unirradiated materials and only 7.11 for the original 0.42 M HDEHP B-Plant solvent.

Finally, a portion of the effluent (0.386 M TBP−0.0156 M HDEHP-NPH) collected during the first part of the loading step was washed successively with equal volumes of 0.24 M $Na_2CO_3$, 6 M $HNO_3$ and water. By addition of NPH and unirradiated HDEHP to the resulting washed organic material an extractant of the composition 0.3 M HDEHP−0.2 M TBP-NPH was prepared. The Sr $E_a^o$ when this extractant was contacted with the synthetic feed was 7.38.

Conditions employed in this first column experiment were far from those now believed optimum (e.g., load at 50° C. vice 25° C., upflow vice downflow water wash to remove NPH, etc.) for treatment of B-Plant solvent. Even so, results of this experiment clearly demonstrate the utility of the ion exchange process not only for fractionating degraded B-Plant solvent but also for restoring strontium extraction capacity to the HDEHP fraction.

Example 2.—Purification of commercial HDEHP

A 0.348 M HDEHP-isopropanol solution was prepared from a commercially available HDEHP. The latter material contained 91.4 wt. percent HDEHP, 2.1 wt. percent $H_2MEHP$, 2300 p.p.m. iron and about 6.5 wt. percent of various neutral organo-phosphorous compounds (pyroesters, 2-ethylhexanol, etc.). Three column volumes (270 ml.) of the 0.348 M HDEHP-isopropanol solution were passed downflow (25° C., 2 ml./min.) through a bed of Rohm & Haas Amberlyst A-21 resin (14–45 mesh) in the hydroxide form. The bed was washed with 180 ml. of isopropanol and then eluted with 270 ml. of 0.6 M KOH in isopropanol. The solution obtained in the latter step was diluted tenfold with water and acidified to about 1 M $HNO_3$ to regenerate an HDEHP product. The final product solution contained 94.8 wt. percent HDEHP, 2.5 wt. percent $H_2MEHP$ and 70 p.p.m. iron; the other 2.7 wt. percent consisted of water and traces of isopropanol. These latter impurities can be easily removed by heating the HDEHP solution for 24 to 48 hours at 50° C. at 15 mm. Hg pressure.

Discounting the 2.7 wt. percent water, the ion exchange process purified the commercial HDEHP from all impurities except $H_2MEHP$. (Incorporation of ethylene glycol washes have provided considerable purification from even this impurity.) Results of this experiment are convincing evidence that the ion exchange scheme is a simple and highly effective method of purifying HDEHP stocks.

The embodiments of the invention in which an exclusive property or privilege is claimed are defined as follows:

1. A method of removing radiolytic degradation products of bis(2 - ethyl-hexyl)phosphoric acid (HDEHP), from HDEHP in an inert organic solvent comprising contacting said HDEHP with a macroreticular ion exchange resin whereby the anion of HDEHP (DEHP$^-$) ion is adsorbed on the resin and the said radiolytic degradation products are not adsorbed.

2. A method in accordance with claim 1 in which the HDEHP is dissolved in an inert organic solvent comprising tributylphosphate and normal alkanes and the solution is passed through a bed of particles of a macroreticular ion exchange resin in hydroxide form whereby the radiolytic degradation products pass through the resin bed and the DEHP$^-$ ion is adsorbed.

3. A method in accordance with claim 1 in which the DEHP$^-$ ion is converted to HDEHP and the HDEHP recovered.

4. A method in accordance with claim 2 in which the DEHP$^-$ is eluted and converted by acid to HDEHP, and the HDEHP recovered from the solution by dilution with water.

5. A method in accordance with claim 4 in which the resin is contacted with an aqueous or alcoholic KOH solution to elute adsorbed DEHP$^-$ ion and convert the resin to its original hydroxide form, and acidifying and adding water to the KOH solution to regenerate and recover the purified HDEHP.

6. A method in accordance with claim 1 in which the macroreticular ion exchange resin is a weak base anion exchange resin comprising a styrene-divinyl benzene copolymer having an amine group attached thereto.

7. A method in accordance with claim 2 wherein the resin is a polymerized mass composed of a cross-linked copolymer of (1) polyunsaturated monomer containing a plurality of $$CH_2=C<$$

groups in nonconjugated relationship and (2) monoethylenically unsaturated monomer, wherein said polymerized mass is constituted by an aggregation of micro beads being visible in an electron photomicrograph and defining a retention of microscopic channels extending through the mass, said mass having amine or quaternary ammonium ion exchange groups thereon.

References Cited

UNITED STATES PATENTS

| 3,410,929 | 11/1968 | Ledding et al. | 260—990 X |
| 2,636,048 | 4/1953 | Toy | 260—990 X |
| 2,936,318 | 5/1960 | Moore | 260—990 |
| 3,641,226 | 2/1972 | Partridge et al. | 260—990 |
| 3,708,508 | 1/1973 | Schulz | 260—990 X |

OTHER REFERENCES

Kunin et al., Ion Exchange Resins, John Wiley & Sons. Inc., New York, 1950, pp. 38 and 39.

LEWIS GOTTS, Primary Examiner

R. L. RAYMOND, Assistant Examiner

U.S. Cl. X.R.

260—963